United States Patent
Thieman (10) Patent No.: US 9,486,913 B2
(45) Date of Patent: Nov. 8, 2016

(54) FASTENER AND STORAGE SYSTEMS

(75) Inventor: Scott T. Thieman, Fort Collins, CO (US)

(73) Assignee: Ironsides Storage Solutions, LLC, Fort Collins, CO (US)

( * ) Notice: Subject to any disclaimer, the term of this patent is extended or adjusted under 35 U.S.C. 154(b) by 962 days.

(21) Appl. No.: 12/384,751

(22) Filed: Apr. 7, 2009

(65) Prior Publication Data

US 2009/0249592 A1  Oct. 8, 2009

Related U.S. Application Data

(60) Provisional application No. 61/043,030, filed on Apr. 7, 2008.

(51) Int. Cl.
*A47B 96/06* (2006.01)
*A47G 29/00* (2006.01)
(Continued)

(52) U.S. Cl.
CPC .............. *B25H 3/04* (2013.01); *A47F 5/0823* (2013.01); *F16B 12/12* (2013.01); *F16B 45/00* (2013.01); *Y10T 24/45225* (2015.01)

(58) Field of Classification Search
CPC .......................... A47F 5/0823; A47F 5/0815
USPC ........... 248/220.31, 220.41, 220.42, 220.21, 248/71, 74.3, 221.12, 222.11, 221.11, 248/222.12, 489, 231.91; 24/591.1, 302, 24/458; 211/57.1, 59.1
See application file for complete search history.

(56) References Cited

U.S. PATENT DOCUMENTS 707,941 A * 8/1902 Pope ............................ 248/48.1
1,794,327 A * 2/1931 Simon ........................... 248/495
(Continued)

OTHER PUBLICATIONS

U.S. Appl. No. 61/043,030, filed Apr. 7, 2008.

*Primary Examiner* — Terrell McKinnon
*Assistant Examiner* — Michael McDuffie
(74) *Attorney, Agent, or Firm* — Samuel M. Freund; Cochran Freund & Young LLC (57) ABSTRACT

Fastener devices and methods are disclosed that may be provided in combination with attachments, retainer elements and peg board systems that are mounted to the surface of a wall or framing construction. The fastener devices and methods may be used or performed in combination with storage elements, as in traditional peg board hooks, clasps, hangers or rings, with fastener elements, as in screws, bolts, and nails, and retained elements generally, such as materials, tools, and other implements. The fastener device and method may correspond to at least one aperture and in some embodiments a plurality of apertures, each aperture extending from a first to a second surface of the fastener device and having configurations unique of the present invention. In some preferred embodiments, apertures are configured to correspond to one or more portions of the retainer element or elements, may be configured to correspond to other fasteners, and may even be configured for desirable adjustment of the retainer element or elements. In some embodiments, the present invention accommodates for the shape, size and configuration of the retainer element or elements. The fastener device and method may be removably engageable with the retainer element(s), fasteners, and the peg board, and may provide a conformable fastener that self adjusts for the shape and configuration of the retainer element or elements, and may be comprised of and function as an elastic or even an adjustable material. The invention may be utilized for different sizes, shapes and configurations of retainer elements, even providing for the invention to allow for a general configuration to accommodate other uses and applications after having been previously used to fasten retainer elements. Embodiments comprise fastener technologies that are resistant to permanent deformation or even fracturing when in removable engagement with a retainer element. Methods such as those corresponding to the devices and assemblies are also disclosed, as well as methods of doing business and methods of manufacture. Applications may include the implementation of additional storage to existing structures such as garages, sheds, off-site storage, and other storage solutions and may be provided in combination with traditional peg board technologies.

12 Claims, 5 Drawing Sheets

(51) Int. Cl.
*A47K 1/00* (2006.01)
*E04G 3/00* (2006.01)
*E04G 5/06* (2006.01)
*F21V 21/00* (2006.01)
*B25H 3/04* (2006.01)
*A47F 5/08* (2006.01)
*F16B 12/12* (2006.01)
*F16B 45/00* (2006.01)

(56) References Cited

U.S. PATENT DOCUMENTS

| | | | | |
|---|---|---|---|---|
| 2,426,975 A * | 9/1947 | Roach | | 139/88 |
| 2,569,622 A * | 10/1951 | Trainor | | 248/477 |
| 2,707,607 A * | 5/1955 | O'Connor | | 248/60 |
| 2,952,343 A * | 9/1960 | Modrey | | 403/376 |
| 2,961,724 A * | 11/1960 | Alling | | 248/220.43 |
| 2,974,916 A * | 3/1961 | Richey | | 248/71 |
| 3,118,644 A * | 1/1964 | Wernig | | 248/73 |
| 3,128,979 A * | 4/1964 | Damelio | | 248/680 |
| 3,169,004 A * | 2/1965 | Rapata | | 248/71 |
| 3,392,949 A * | 7/1968 | Meyer, Jr. | | 248/220.42 |
| 3,477,677 A * | 11/1969 | Hindley | | 248/220.31 |
| 3,545,711 A * | 12/1970 | Scheneman | | 248/220.43 |
| 3,879,006 A * | 4/1975 | Staudte, Jr. | | 248/220.43 |
| 3,941,343 A * | 3/1976 | Kennedy | | 248/220.31 |
| 4,105,179 A * | 8/1978 | Elliott | | 248/220.43 |
| 4,304,382 A * | 12/1981 | Jelen | | 248/220.42 |
| 4,482,121 A * | 11/1984 | Fink | | 248/489 |
| 4,508,249 A * | 4/1985 | Kotchy | | 224/219 |
| 4,641,807 A * | 2/1987 | Phillips | | 248/480 |
| 4,804,161 A * | 2/1989 | Wallo | | 248/544 |
| 4,928,912 A * | 5/1990 | Florek | | 248/220.43 |
| 4,941,632 A * | 7/1990 | Couls et al. | | 248/220.43 |
| 5,165,640 A * | 11/1992 | Williams | | 248/220.43 |
| 5,531,415 A * | 7/1996 | Kallemeyn | | 248/220.31 |
| 5,743,507 A * | 4/1998 | Rushing | | 248/495 |
| 5,855,347 A * | 1/1999 | Hollingsworth et al. | | 248/220.41 |
| 6,036,149 A * | 3/2000 | Del Pino et al. | | 248/231.91 |
| 6,202,962 B1 * | 3/2001 | Snyder | | 248/60 |
| 6,322,039 B1 * | 11/2001 | De Luccia | | 248/553 |
| 6,454,230 B1 * | 9/2002 | Accuardi | | 248/220.31 |
| 6,581,885 B2 * | 6/2003 | Polad | | 248/74.3 |
| 6,611,995 B2 * | 9/2003 | Jackson et al. | | 24/298 |
| 7,198,242 B1 * | 4/2007 | Bently | | 248/300 |
| 8,690,113 B1 * | 4/2014 | Wright et al. | | 248/477 |

* cited by examiner

PRIOR ART

FASTENER AND STORAGE SYSTEMS

This U.S. Non-provisional Patent Application claims the benefit of U.S. Provisional Patent Application No. 61/043,030, hereby incorporated by reference in the entirety herein.

BACKGROUND OF THE INVENTION

Technologies for the placement and storage of materials and tools are well known and are particularly applied in the implementation of additional storage to existing structures such as garages, sheds, off-site storage, and other storage solutions. Wall-implemented technologies relating to peg board have historically dominated the market for hand-held tools and other light weight materials and implements to be stored.

Various forms of peg boards and attachment means have been previously developed to aid in storage on structural walls. Hooks and clasps, herein described as attachment means or retainer elements, have been developed that attach to the peg board and through one or more holes of the peg board. The size, weight and strength of the attachment means, usually a light-weight steel alloy or aluminum, may be limited by the size and thickness of the peg board and the material of the peg board, usually provided in sheets of various sizes and made from particle board. A further accommodation must typically be made for spacing behind the peg board to allow for the attachment to insert into the peg board and between the peg board and the structural wall. In some instances, accommodation for the attachment is afforded in the space behind the peg board between the peg board, the wall, and framing members installed with the peg board, such as cut wood. Various forms of attachments and a typical installation of peg board is shown in the prior art of FIGS. 1A through 1K.

The accommodation is typically made by mounting the peg board upon a framing member such as a 1 inch by 4 inch piece of construction lumber that is further attached to the structural wall, as is shown in FIGS. 1A and 1B, with a general view of the peg board in FIG. 1C. The framing member, regardless of the material or configuration used, creates additional complication to the storage solution, creates additional mounting requirements and holes in the structural wall, and may even block some or many of the holes of the peg board, making the storage solution less attractive functionally as well as visually.

Another primary weakness of peg board systems has been the limitation of the strength of the peg board material and its inability to hold for any preferred duration any material or item of significant weight. Many attempts have been made to either 1) strengthen the attachment point of the attachment means or retainer elements to the peg board, or 2) strengthen the size, material and configuration of the board that was traditionally presented as particle peg board, including laminating the particle board and providing the board in different types of material, such as plastic or metal. Many of these attempts required such complexity in the construction and implementation of the system that in practice the technology is not affordable or is too time consuming in the installation and use of the product.

A further weakness of the traditional peg board systems and the use of traditional attachments means or retainer elements, and potentially viewed in combination with the previously described shortcomings, are the potential instability of the attachment means or retainer elements once positioned within the peg board holes. As previously described, common attachment means such as hooks, some of which are described in FIGS. 1G through 1K, typically include portions that are designed to be inserted within common sized peg board holes to allow the hook to hang from the peg board, to provide to some extent for the thickness of the peg board, and in some traditional systems to include a second insertion peg in an attempt to increase the stability of the hook once hung from the peg board.

However, these traditional attachment means do not provide a more preferred and secured retention of the hook and any material, item or implement to be stored by the attachment means or retainer element, and especially those materials, items or implements thought to be too heavy or bulky for common peg board systems. The attachment means or retainer elements may be unstable within larger holes of the peg board, the size of the portions of the attachment means or retainer elements designed to ensure that the hook or other attachment will simply fit within the hole(s) of the peg board to provide a hung configuration and to allow ease of removal, adjustment and reconfiguration of the attachment means or retainer element on the peg board. Not only will the system suffer from the traditional weaknesses of the peg board itself, but the attachment means may even move or otherwise be unstable within the holes of the peg board. Some common failures resulting from the lack of stability between the attachment means or retainer element and the peg board include: the movement of the attachment means or retainer element, particularly when under the weight of material, item or implement to be retained; the disengagement of the attachment means from the peg board; or even the rip out of the attachment means or retainer element from the peg board, potentially resulting in damaged peg board and non-retention or storage of the material, item or implement. The peg board holes may no longer effectively engage with attachment means or retainer elements, and damage to the material, item or implement to be retained may result.

Other attempts do not address the implementation of a system that provides functionality beyond the mere attachment of light-weight materials or tools. Still other attempts may have addressed full storage capacity, but are themselves too bulky, too complex, or do not afford the flexibility of a customized and adjustable storage solution. FIGS. 1D, 1E, and 1F depict some common technologies utilized in attempts to address the stability of the attachment means or retainer element and the peg board and the continued retention of the material, item or implement to be retained. However, as previously mentioned, these traditional attempts to solve the recognized drawbacks of traditional peg board systems lack a more customizable solution for traditional and nontraditional attachment means retention elements, and may even continue to suffer from the lack of stability commonly suffered by peg board systems despite the addition of these technologies. Each may still suffer from the potential for movement, disengagement or even rip out as previously described. Moreover, each may not fully accommodate for the varied types of attachment means or retention elements that exist and continue to be developed for the peg board market.

In addition to all of the deficiencies previously described, the prior art may suffer from one or more of the following deficiencies. The prior art may require attachment systems and separate and additional mounting brackets or other mounting solutions as previously described. The prior art may not sufficiently accommodate various attachments between the attachment system and the structural wall, requiring that the attachment system be raised from the structural wall surface by a mounting solution.

Regarding many of these systems, and as previously mentioned, one major concern is the structural integrity of the hole, particularly if a fastener such as a screw or bolt or other threaded means is required. Straight wall holes of peg board typically may fail when a threaded fastener is used, creating a deformation of the wall that will result in a split out, resulting in a less stable mount of the fastener or total failure of the material.

SUMMARY OF THE INVENTION

Fastener devices and methods are disclosed, devices and methods that in still further embodiments may be provided in combination with attachment means and peg board systems that are mounted to the surface of a wall structure such as a wall surface or a framing construction. The fastener devices and methods may be used or performed in combination with one or more retainer elements, such as storage elements, as in traditional peg board hooks, clasps, hangers or rings, and even with fastener elements, as in screws, bolts, and nails. The invention comprises in some embodiments fastener devices and methods, alone or in combination with or performed with retainer elements or retained elements generally, such as materials, tools, and other implements.

The invention in some embodiments may comprise fastener devices and methods corresponding to at least one aperture and in some embodiments a plurality of apertures, each aperture in some embodiments extending from a first to a second surface of the fastener device and having configurations unique of the present invention. The invention may be configured to accommodate and fasten one or more retainer elements, such as peg board hooks, hangers, clasps or rings, and various sizes and configurations thereof. In some embodiments, the invention may be provided in combination with the retainer elements themselves, while other configurations and provision of the invention are also feasible consistent with the present invention. In some preferred embodiments, apertures are configured to correspond to one or more portions of the retainer element(s), may be configured to correspond to other fasteners, and may even be configured for desirable adjustment of the retainer element(s).

In some embodiments, the present invention provides fastener devices and methods having features that accommodate for the shape, size and configuration of the retainer element(s). In some preferred embodiments the invention is removably engageable with the retainer element(s), fasteners, and the peg board.

In some preferred embodiments, the invention may function to provide a conformable fastener that self adjusts for the shape and configuration of the retainer element(s). In one embodiment, the invention may be comprised of and function as an elastic or even an adjustable material. In still further embodiments, the invention may provide for the accommodation of one or more retainer elements whereby after having providing for and adjusting to the shape and configuration of retainer element(s), the invention may be utilized thereafter for different sizes, shapes and configurations of retainer element(s), even providing for the invention to allow for a general configuration to accommodate other uses and applications after having been previously used to fasten retainer elements. In still further embodiments, the invention may be provided with preconfigured fastener features for particular applications and retainer elements.

The invention may accommodate either a retainer element such as hooks or other hangers while also accommodating for threaded fasteners. The apertures also preferably accommodate storage elements having configurations for two insertion points for standard peg board holes that help secure the retainer element. Embodiments in accordance with the present invention comprise fastener technologies that are resistant to permanent deformation or even fracturing when in removable engagement with a retainer element.

The invention may be manufactured in some embodiments as a plurality of fastener devices, and in some embodiments may be manufactured and sold as a linearly produced plurality of fastener devices, such as may be embodied in a strip or roll of fastener devices. In still other embodiments the fastener devices may be manufactured individually as singular fastener devices and sold as one or a plurality of individual fastener devices. In some particular embodiments, one or a plurality of fastener devices may be provided in combination with one or more retainer elements.

Fastener devices are disclosed as embodiments of the invention. In one embodiment, an adjustable fastener device is disclosed, having a first fastener surface, a second fastener surface facing opposite to the first fastener surface, and at least one aperture extending from the first fastener surface to the second fastener surface, wherein the at least one aperture is retentionally configured to an element to be retained by the fastener device.

Methods of fastening are further disclosed and are previously disclosed above. In one embodiment, a method of fastening an element to be retained is disclosed, having the steps of providing a first and second fastener surface and at least one aperture extending from the first fastener surface to the second fastener surface, the at least one aperture retentionally configured to an element to be retained by the fastener device, retentionally adjusting to the configuration of the element to be retained, and adjustably retaining the element to be retained.

The features of the present invention may be directed to accommodating a retainer element or elements capable of being removably engaged with at least one perforation of a peg board system and corresponding to a wall structure to which the retainer element or elements are mounted, accommodating for threaded engagement of a threaded fastener with the perforation, and accommodating for removable engagement of a retainer element or elements with the perforation, removably engaging the retainer element or elements with the perforation, and fastening the retainer element. In some preferred embodiments, features provide one or more retainer elements and fastening the retainer element or elements in accordance with the present invention.

Furthermore, storage embodiments are disclosed providing adjustably retained and fastened storage or work place components that may be retained and fastened to a surface or surfaces of a wall or framing structure. Methods such as those corresponding to the devices and assemblies are also disclosed, as well as methods of doing business and methods of manufacture. Applications may include the implementation of additional storage to existing structures such as garages, sheds, off-site storage, and other storage solutions and may be provided in combination with traditional peg board technologies.

BRIEF DESCRIPTION OF THE DRAWINGS

FIGS. 4A through 4N are embodiments of the present invention.

DETAILED DESCRIPTION OF PREFERRED EMBODIMENTS OF THE INVENTION

The invention is described in preferred and alternative embodiments that address one or more inadequacies of the prior art. Accordingly, embodiments of the invention are shown and described in the figures, written description, and throughout the present disclosure.

The present invention in preferred embodiments is wall structure mounted and may be utilized in some preferred embodiments with peg board systems or other like systems. Accordingly, in some embodiments the invention may be mounted to a surface of a wall, such as a garage wall or other residential or commercial wall, or even other wall structures, such as wooden framing, or other vertical supportive surface understood by those skilled in the art. The invention may be mounted in accordance with the application of previous technologies such as retainer elements referred to in some instances as storage elements, as in traditional peg board hooks, clasps, hangers or rings, and even with fastener elements, as in screws, bolts, and nails.

Furthermore, the present invention in some preferred embodiments is directed to be implemented in combination with common elements to be retained. These elements may comprise retainer elements and may include, but the invention not being limited to the following as one skilled in the art would appreciate: storage elements, such as hooks, clasps, pegs, supports, hangers or rings, and particularly storage elements having one or at least two insertion elements, such as the hooks shown in FIGS. 1A, 1B and 1G through 1K. The elements may include, or the invention may incorporate, but the invention not being limited to the following as one skilled in the art would appreciate, fastener elements, such as nails, screws, or bolts, and particularly threaded fastener elements such as screws and bolts, and the fasteners shown in FIG. 1D through 1F.

FIG. 1C describes certain traditional retention systems such as peg board, along with a mounting element such as structural support or in some cases 1 inch by 4 inch construction wood, and reinforced or extruded straight wall holes of peg board or other retention systems depicted in FIGS. 1A and 1B.

Particular advantages stem from the present invention and in relation to the prior art. One is the novel way in which preferred stability and retention of the elements to be retained are achieved as compared to the structure and functionality of traditional peg board systems in cooperation with traditional retainer or fastener elements. Configurations of the aperture of the present invention, and in some embodiments of the aperture as it relates to the size, shape and configuration of the elements to be retained, comprises features that allow for the functionality of use of retainer or fastener elements described above while further allowing for the fastening of the elements to be retained to reduce movement or detachment of the elements and the retainer or fastener elements, as well as reduce or even avoid deformation and destruction of the wall structure or peg board. When fastening a retainer element such as a hook to a wall surface or peg board of the present invention, the structural integrity of the wall surface or peg board is maintained, while the retainer element is secured and the supported material, item or implement, is secured therewith, whereas traditional systems such as peg board, or peg board and fasteners as described in FIG. 1, may likely have the retainer element or fastener element disengage from the peg board or wall structure, the peg board or wall structure deform or the holes otherwise split out, or the material of the wall structure or peg board will otherwise fail from the inherent weakness of the material. Furthermore, the position of the retainer device or fastener element and the configuration of storage of the material, item or implement retained by the retainer element or fastener element on the wall surface or peg board are maintained.

It should be understood from the present disclosure that the elements to be retained may not only be the supported material, item or implement that is to be retained, say to the peg board, but may also be the retainer elements or fastener elements themselves, such elements also to be retained. Either disclosure of elements to be retained is consistent with the present invention and disclosed herein in some preferred embodiments of the invention.

Specifically, in traditional systems such as fibrous wood peg board, failure may occur for fastener elements or even retainer elements given the thickness or strength of the material at the hole or the lack of fastening capacity. The fastening elements of FIGS. 1D and 1E, for example, by themselves may not even accommodate a retainer element, and if they do, receive the direct force and weight of the retainer element and the corresponding material, item or implement. This may lead to increased probability that the traditional fastener will disengage or damage the wall structure or peg board as previously described. The fastening element of FIG. 1F, furthermore, may not adequately fasten the retainer element, such as a peg board hook, as forces from the retainer element and any material, item or implement act upon the minimal retention provided by the clip hooks of the fastener and impact how the fastener remains engaged with the peg board. Even for traditional metal and straight-wall holes, failure may still be a problem given the traditional extrusion process used to create the hole.

Figure 1:
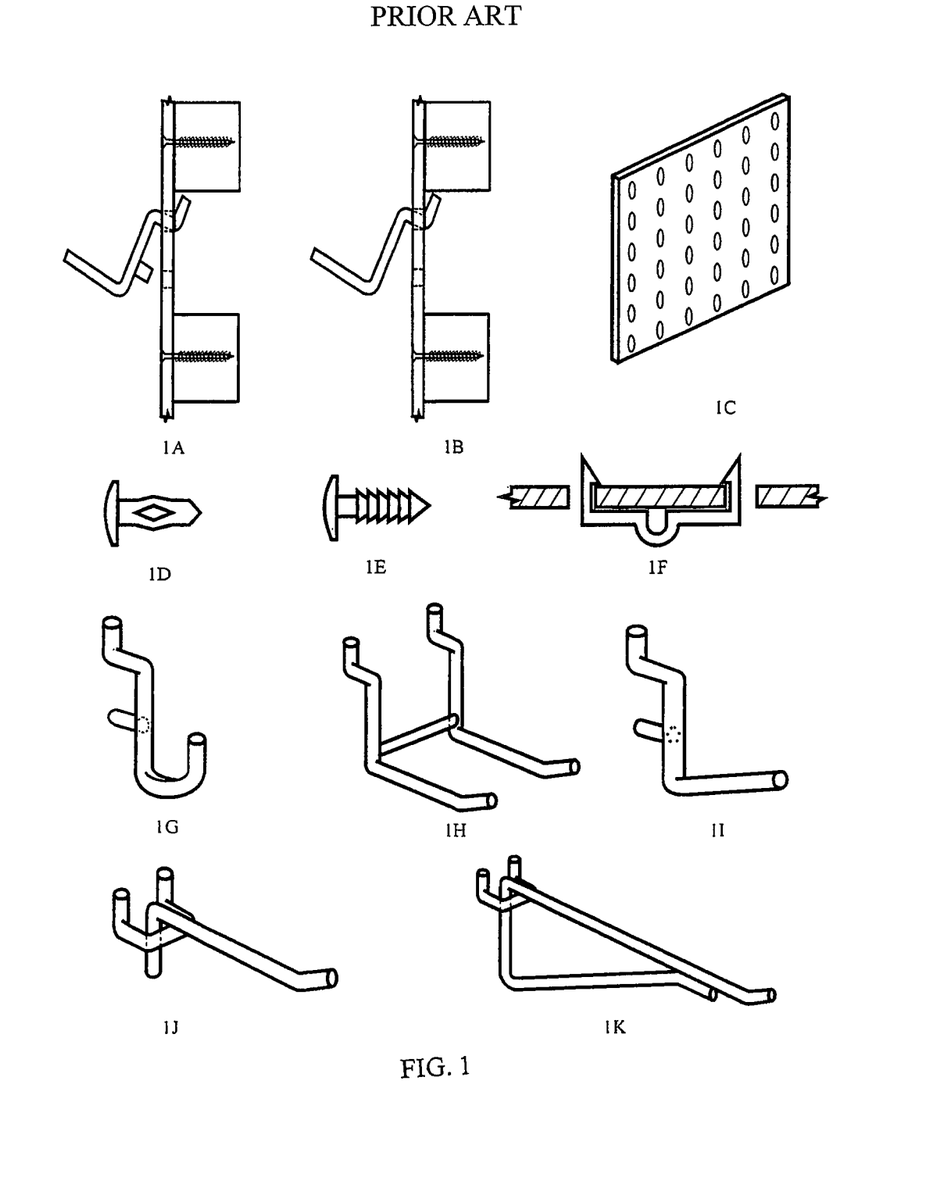
FIGS. 1A through 1K are descriptions of the prior art.
Figure 2:
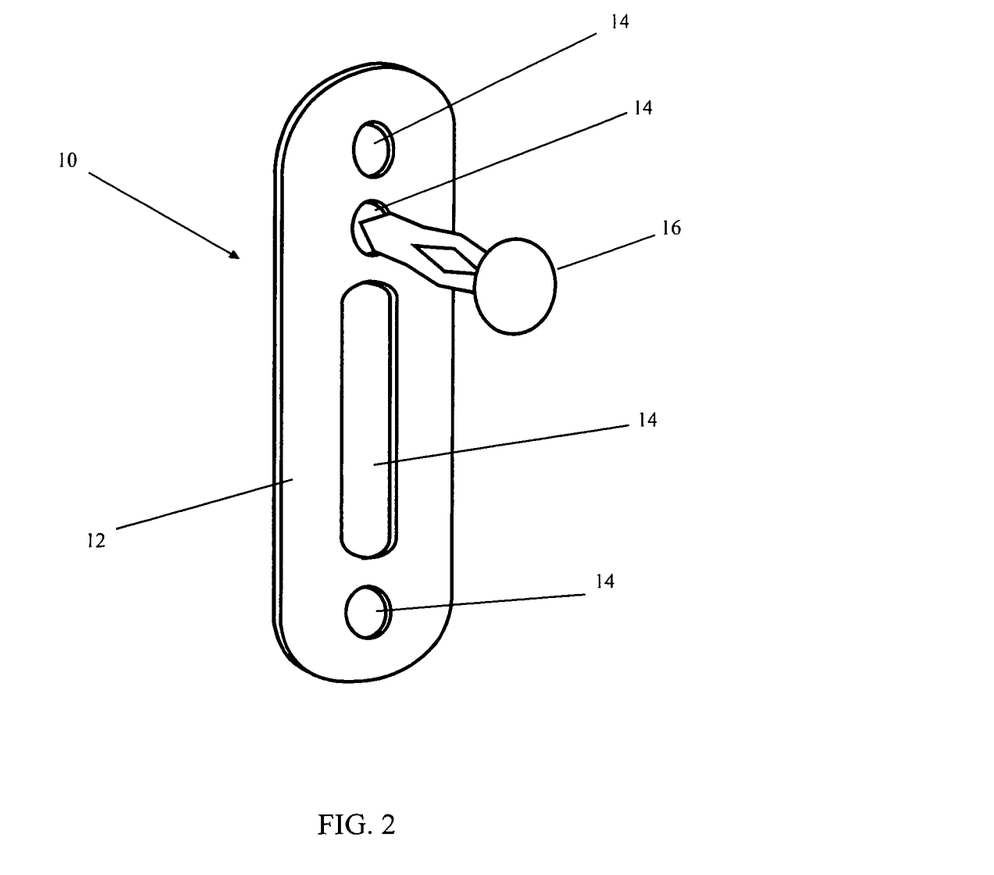
FIG. 2 is an isometric view of some embodiments of the present invention.
Figure 3:
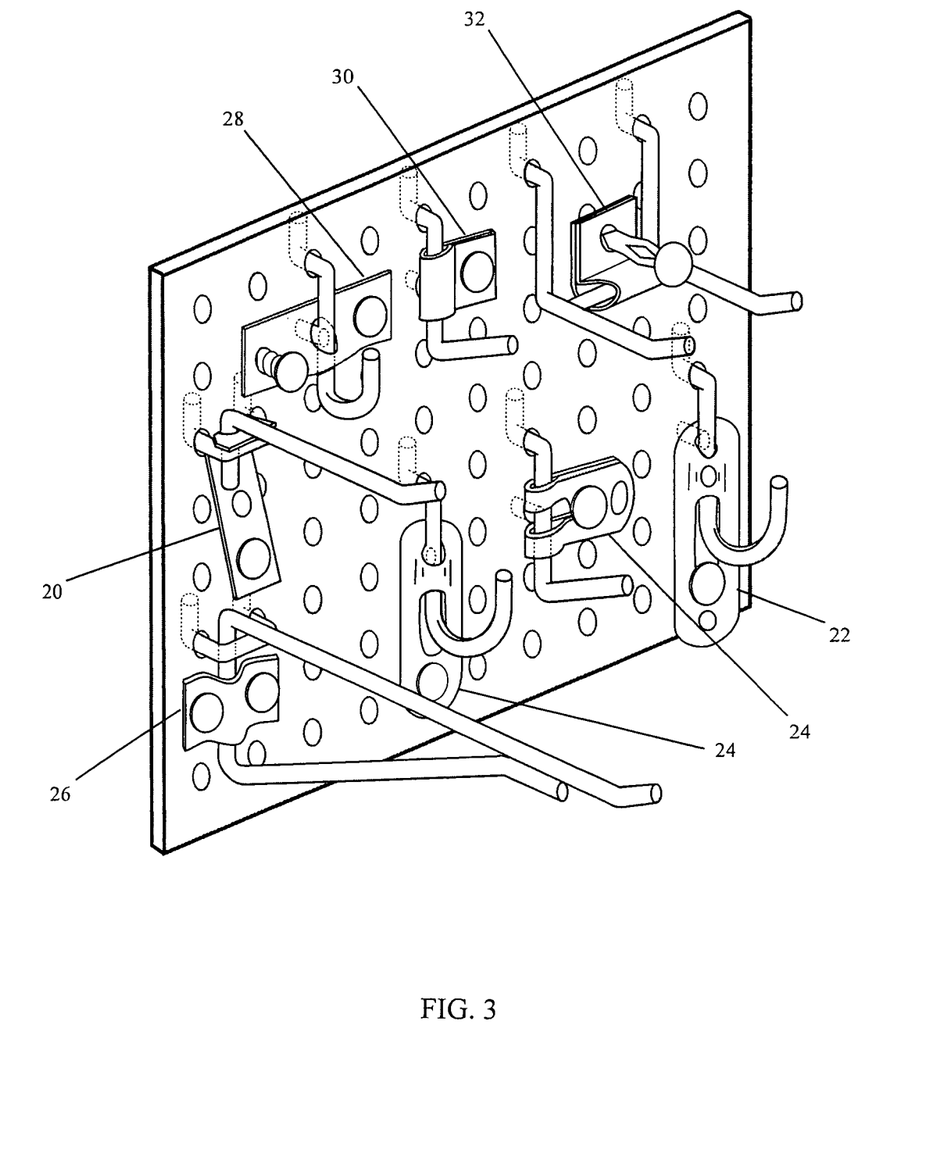
FIG. 3 is front isometric views of a number of embodiments of the present invention.

Accordingly, FIG. 2 describes one embodiment of the present invention. Fastener device 10 may be configured to any wall structure or peg board type system and may have at least one aperture in some embodiments. Other embodiments may be configured with one or more apertures, apertures that may provide for fastening of the retainer element or fastener element to the wall structure or peg board, while one or more apertures or portions of the fastener device such as fastener surfaces may independently or in combination provide for direct engagement with the retainer or fastener elements to also provide for fastening functionality. FIG. 3 depicts various embodiments of the present invention and configurations for fastening of various retainer or fastener elements and elements to be retained generally. Fastener device 10 may be mounted on the wall structure or peg board such as in a vertical or horizontal configuration, and may be linearly positioned or offset, as shown with fastener element 20, for example, with respect to some forms of wall structure or peg board having a matrix or linear type configuration of holes.

The invention may provide the fastener device 10 as a fastener engagement element, such as a fastener surface 12, a second fastener surface facing opposite to fastener surface 12 (facing into the page in the FIG. 2 view), and at least one of, and in some embodiments a plurality of apertures 14. The aperture preferably extends from the fastener surface 12 to the opposite side of the device and to the second fastener surface. In some additional embodiments the fastener device may further comprise a retainer element or fastener element, such as a fastener element 16 in the embodiment shown in FIG. 2.

As described in FIG. 3, the configurations of the fastener devices can be configured to provide preferred fastening of the retainer elements. The fastener device 10 can be provided to accommodate various retainer elements, for example those hooks shown in FIG. 3, with various retention configurations. In some embodiments, the apertures accommodate hanger features of the retainer elements, such as shown in fastener devices 22, 24 that accommodate the insertion of the hook during installation and fastening of the retainer element. Each of the fastening devices may conform, in some embodiments, to features of the retainer elements or fastener elements, such as providing fastenably conformable fastener engagement elements such as fastener surface 12 as described in FIGS. 2, 3 and 5 (FIG. 5 describing fastenably conformable fastener engagement elements without the restraining elements shown). In some embodiments, the fastener engagement element or fastener surface 12, and the second fastener surface, conforms about a portion of the retainer element or fastener element to provide fastening of the retainer or fastener element with the wall structure or peg board system or the like. Furthermore, in some embodiments, the at least one aperture may conform about a portion of the retainer element or fastener element to provide fastening of the retainer or fastener element with the wall structure or peg board system or the like, such as shown for example in embodiments 22, 24, 34 of FIG. 3 and FIGS. 5I through 5L of FIG. 5. Furthermore, various sizes and numbers of apertures may be provided.

Broadly disclosed in many preferred embodiments are the apertures 14 or the at least one aperture being retentionally configured to an element to be retained by the fastener device. In still further embodiments, the fastener surfaces 12 are retentionally configured to an element to be retained by the fastener device. Again, as may be shown in the embodiments of FIG. 3, FIGS. 4 and 5, the fastener surfaces, and in some embodiments the at least on aperture or apertures 14, are configured to support and hold the retainer or fastener elements, and correspondingly an element to be retained, so as to be retentionally configured to the retainer or fastener element. In some embodiments the surfaces 12 or apertures 14 wrap around, contact or otherwise retain a portion of the retainer or fastener elements.

In one embodiment, such as that described in FIG. 2 and as further described as fastener devices 22, 34, three apertures are provided to accommodate multiple fastening configurations, such as the positioning and use of one or more fastener elements 16, and how the fastener engagement element or fastener surfaces 12 may be configured to fasten the retainer element to the wall structure or peg board system, also allowing for the versatility and reuse of the fastener devices for multiple applications.

Figure 4:
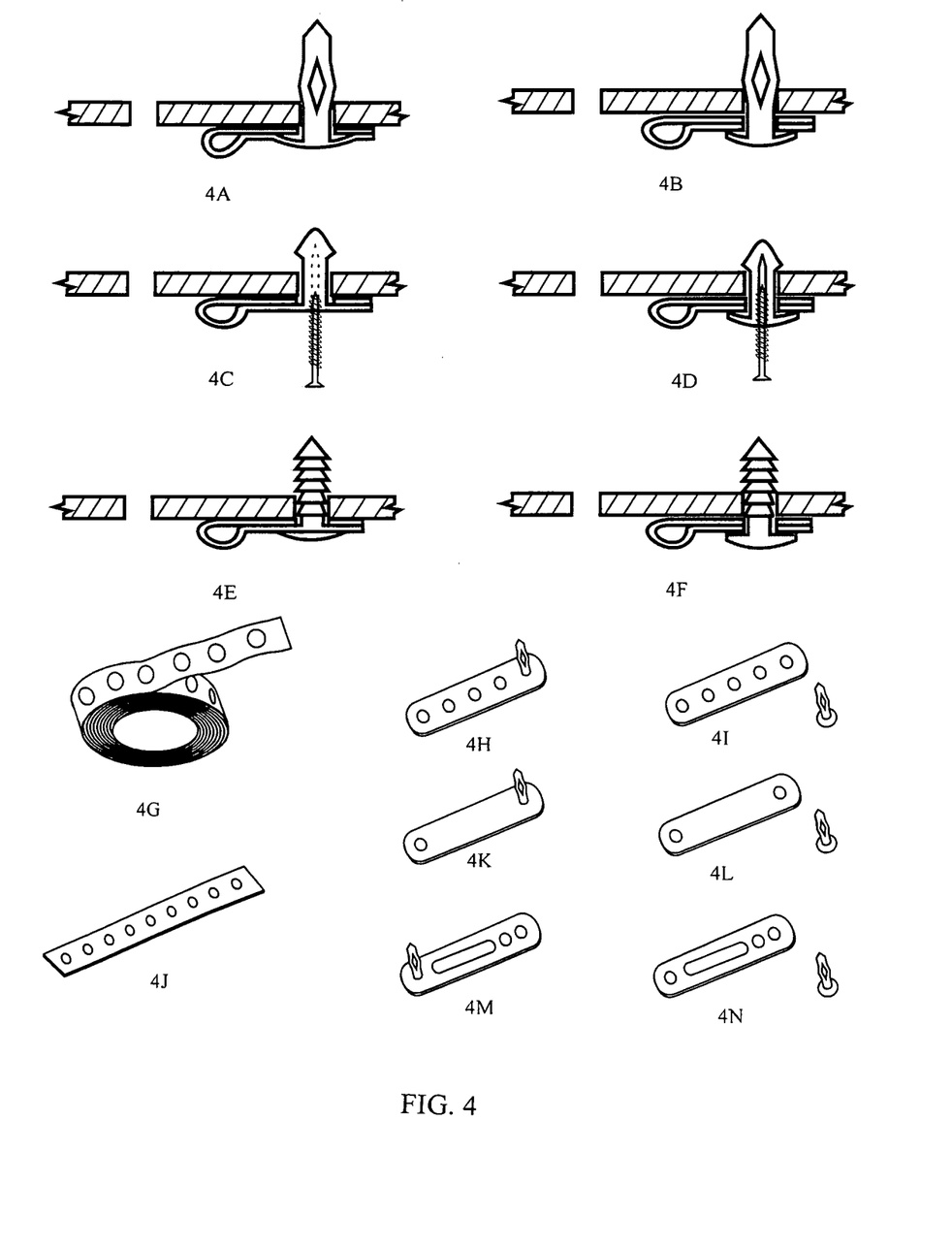

Again, as shown in FIGS. 2, 3 and 6, and as shown in FIG. 4, the fastener engagement elements or fastener surfaces 12 may take on various fastening configurations. Fastener devices 30, 32, for example, describe the fastener engagement circumferentially extending about an elongated or rounded portion of the retainer element. In other embodiments, the fastener surfaces 12 may fastenably conform about some portion of surface of the retainer element.

FIGS. 4A through 4F describe the use of one or more fastener elements 16 consistent with the present invention and part thereof for securing the fastener device 10 to the wall structure or peg board system. Each embodiment of the present invention shown and described in FIGS. 4A through 4F are features and aspects comprising fastener elements and the fastener engagement element or fastener surfaces as novel and non-obvious aspects of the present invention.

FIGS. 4G and 4J describe embodiments of the present invention, as a device, method, process of manufacture and product by process, embodied as linear strips or rolls of fastener devices. FIGS. 4H, 4I, and 4K through 4N further describe fastener devices as fastener engagement elements, fastener surfaces, fastener elements, and apertures as embodiments and aspects of the present invention. In one embodiment, the fastener elements of FIGS. 4H, 4K and 4M may be connected with or unitary with the fastener device 10 and the fastener surfaces or apertures. In still further embodiments, the fastener elements may be provided separate from the fastener device 10 and the fastener surfaces or apertures as shown in FIGS. 4I, 4L and 4N.

Broadly described herein are fastener devices and methods, devices and methods that in still further embodiments may be provided in combination with attachment means such as retainer devices, retainer and fastener elements, and peg board systems that are mounted to the surface of a wall structure such as a wall surface or a framing construction. The fastener devices and methods may be used or performed in combination with one or more retainer elements, such as storage elements, as in traditional peg board hooks, clasps, hangers or rings, and even with fastener elements, as in screws, bolts, and nails.

Figure 5:
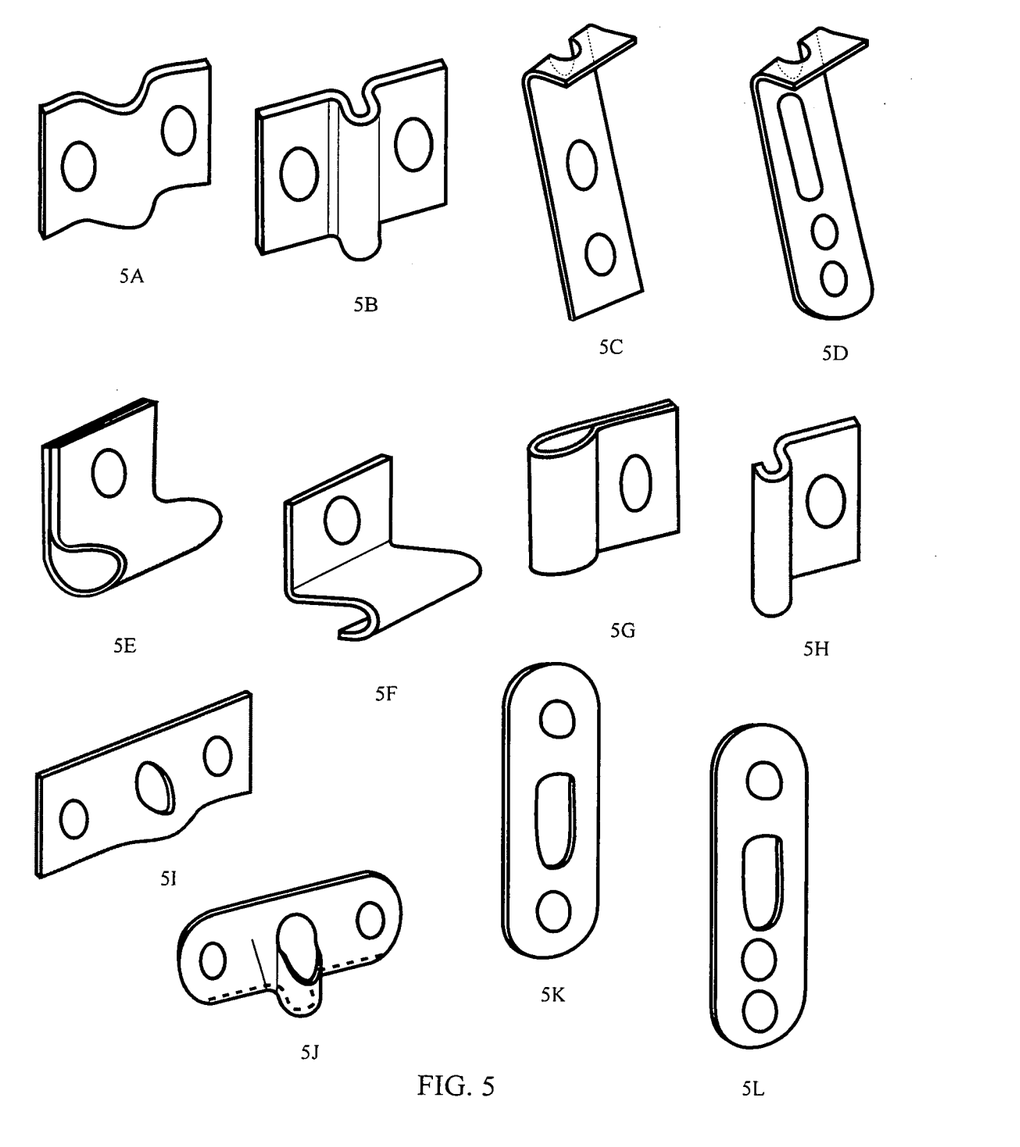
FIGS. 5A through 5L are embodiments of the present invention described without depiction of retainer elements such as hooks to which the invention may be configured to or conformable with for fastening.

The invention comprises fastener devices and methods corresponding to at least one aperture and in some embodiments a plurality of apertures 14, each aperture in some embodiments extending from a first to a second surface of the fastener engagement elements 12 and having configurations unique of the present invention. The invention may be configured to accommodate and fasten one or more retainer elements, such as peg board hooks, hangers, clasps or rings, and various sizes and configurations thereof. In some embodiments, then invention may be provided in combination with the retainer elements themselves, while other configurations and provision of the invention are also feasible consistent with the present invention. In some preferred embodiments, apertures are configured to correspond to one or more portions of the retainer or fastener elements, may be configured to correspond to other fasteners, and may even be configured for desirable adjustment of the retainer or fastener elements. FIG. 5 may provide a unique view of the apertures 14 and the fastener engagement elements or fastener surfaces 12, wherein configurations of shape and contour are shown as unique aspects of the present invention that allow for the use of many types of retainer devices and various implementations of fastening in accordance with the present invention. For example, FIGS. 5I through 5J disclose apertures that may adjustably or permanently configured to shapes and contours of retainer elements reflected in the shape and configuration of the apertures 14 and the shape and configuration of the fastener engagement elements or fastener surfaces 12, and in these embodiments raised or rounded surfaces of the fastener engagement elements 12 and non-circular apertures 14. Other shapes and contours are described in FIGS. 5A through 5H, and in accordance with the present invention, may be fixed, conformable, adjustable or having other disclosed features consistent with fastening as disclosed for the present invention.

Again, in some embodiments, the present invention provides fastener devices and methods having features that accommodate for the shape, size and configuration of the retainer or fastener elements. In some preferred embodiments the invention is removably engageable with the retainer elements, fasteners, and the peg board. Each of these features is described in the figures.

In some preferred embodiments, the invention may function to provide a conformable fastener that self adjusts for the shape and configuration of the retainer elements. In one embodiment, the invention may be comprised of and function as an elastic or even an adjustable material. In still further embodiments, the invention may provide for the accommodation of one or more retainer or fastener elements whereby after having providing for and adjusting to the shape and configuration of retainer or fastener elements, the invention may be utilized thereafter for different sizes, shapes and configurations of retainer or fastener elements, even providing for the invention to allow for a general configuration to accommodate other uses and applications after having been previously used to fasten retainer elements. In still further embodiments, the invention may be provided with preconfigured fastener features for particular applications and retainer elements.

The invention may accommodate either a retainer element such as hooks or other hangers while also accommodating for threaded fasteners. The apertures also preferably accommodate storage elements having configurations for two insertion points for standard peg board holes that help secure the retainer element. The present invention may of course provide for configurations of retainer or fastener elements having one or more than two insertion points, having apertures corresponding to the insertion points and fastener engagement elements or fastener surfaces corresponding to portions or features of the restrainer elements. Embodiments in accordance with the present invention comprise fastener device and method technologies that are resistant to permanent deformation or even fracturing when in removable engagement with a retainer or fastener element.

The invention may be manufactured in some embodiments as a plurality of fastener devices, and in some embodiments may be manufactured and sold as a linearly produced plurality of fastener devices, such as may be embodied in a strip or roll of faster devices, for example FIGS. 4G and 4J. In still other embodiments the fastener devices may be manufactured individually as singular fastener devices and sold as one or a plurality of individual fastener devices. In some particular embodiments, one or a plurality of fastener devices may be provided in combination with one or more retainer elements.

Methods of fastening are further disclosed and are previously disclosed above. The steps may comprise in some preferred embodiments accommodating retainer elements capable of being removably engaged with at least one perforation of a peg board system and corresponding to a wall structure to which the retainer elements are mounted, accommodating for threaded engagement of a threaded fastener with the perforation, and accommodating for removable engagement of retainer or fastener elements with the perforation, removably engaging the retainer or fastener elements with the perforation, and fastening the retainer or fastener element. In some preferred embodiments, the steps comprise providing one or more retainer elements and fastening the retainer or fastener elements in accordance with the present invention.

Additional embodiments of the invention as methods of fastening are disclosed herein. In one preferred embodiment, a method of fastening is disclosed, and again referencing FIGS. 1 through 5, a method of fastening an element to be retained, comprising the step of providing a first and second fastener surface and at least one aperture extending from the first fastener surface to the second fastener surface, the fastener surfaces, and in some embodiments the at least one aperture, retentionally configured to an element to be retained by the fastener device. The surfaces, and in some embodiments the at least one aperture, is retentionally adjusted to the configuration of the element to be retained, and the element to be retained is then adjustably retained.

Furthermore, storage embodiments are disclosed providing adjustably retained and fastened storage or work place components that may be retained and fastened to a surface or surfaces of a wall or framing structure. Methods such as those corresponding to the devices and assemblies are also disclosed, as well as methods of doing business and methods of manufacture. Applications may include the implementation of additional storage to existing structures such as garages, sheds, off-site storage, and other storage solutions and may be provided in combination with traditional peg board technologies.

The structural integrity of the present invention can be even more fully appreciated when considering the manufacture of the fastener engagement elements or fastener surfaces 12 and the apertures 14. The material of the fastener device and that comprises of the functionality of the fastener engagement elements or surfaces 12 and defining apertures 14 allows for the functionality of the invention as previously described. Accordingly, in preferred embodiments, the fastener device will conform to, or be pre-configured, to one or more retainer or fastener elements and their size and shape. The result is a fastener device that will provide sufficient fastening and stability to retainer or fastener elements, or elements to be retained generally, that are otherwise susceptible to the drawbacks previously described.

The invention further comprises the methods, methods of doing business, methods of manufacture, as previously described and as disclosed below. Furthermore, the invention may comprise the following steps as methods of fastening or methods of retainer implements or materials to a wall structure as may be appreciated from the previous description and as further described below.

Methods of retaining implements, items or materials to a wall structure are further disclosed. The steps may be described in some preferred embodiments, and in conjunction with the description and figures previously presented, as comprising a step of accommodating a retainer element with a fastener device corresponding to the wall structure. The retainer element is capable of being removably engaged with at least one aperture of the fastener device as shown for the number of embodiments of the present invention and particularly in FIGS. 1 through 5.

Additional aspects of the invention, independent or in combination with the features of the invention previously described are further realized as methods of fastening. As but one example, a method of fastening at least one retainer element to a wall structure is disclosed. The invention accordingly may comprise the step directed to a wall structure, the wall structure in some embodiments comprising peg board or other like system. The steps may comprise: providing at least one fastener device having at least one aperture; mounting at least one retainer or fastener element to the wall structure; and fastening said at least one retainer or retention element with the fastener device to the wall structure, the fastener device capable of being removably engaged at the at least one aperture or retainer surface with the at least one retainer or fastener element and removably engaged with the wall structure at an aperture or retainer surface of the fastener device; accommodating for engagement of the fastener device with the wall structure; and accommodating for removable engagement of the retainer or fastener element with the wall structure.

Additional aspects of the invention are further realized as methods of business. As but one example, a method of installing retention systems to a wall structure can be conducted as part of services or delivery of the system. The invention accordingly may comprising the step of determining a storage need and storage configuration of a wall structure, the wall structure in some embodiments comprising peg board or other like system, as may be ordered by the customer or as is otherwise a requirement for installation. Further steps may comprise: providing at least one fastener device having at least one aperture or retainer surfaces; mounting at least one fastener device to the wall structure; and fastening at least one retainer or fastener element with the fastener device to the wall structure, the retainer or fastener element capable of being removably engaged at the at least one aperture or fastener surface with the at least one fastener device and removably engaged with the wall structure at an aperture or retainer surface of the fastener device; accommodating for engagement of the fastener device with the wall structure; and accommodating for removable engagement of the retainer or fastener element with the wall structure. The process as described above and as disclosed as part of and an embodiment of the invention, yields the installation of the fastener device to a wall structure and the completion of the service.

Manufacturing methods and products by process are clearly defined as features of the present invention, and may further be disclosed as methods of manufacturing fastener devices, consistent with the present invention as previously described.

As can be easily understood from the foregoing, the basic concepts of the present invention may be embodied in a variety of ways. It involves one or more apparatus, device, processes, and business methods of fastening, and in some particular embodiments, to methods of business, and apparatus, devices, processes and methods directed to fastening, as well as the use of or incorporation of traditional technologies, as well as devices, apparatus, singular or plural, and assemblies to accomplish the appropriate function. In this application, the techniques are disclosed as part of the functionality of the various devices described and as steps that may be inherent to utilization. In addition, while some devices are disclosed, it should be understood that these not only accomplish certain methods but also can be varied in a number of ways. Importantly, as to all of the foregoing, all of these facets should be understood to be encompassed by this disclosure.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with a broadly supporting interpretation, common dictionary definitions should be understood as incorporated for each tern1 and all definitions, alternative terms, and synonyms such as contained in the Random House Webster's Unabridged Dictionary, second edition are hereby incorporated by reference.

Further, if or when used, the use of the transitional phrase "comprising" is used "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

I claim:

1. A peg board hook retention apparatus comprising:
a flat, conformable fastener that itself comprises:
a fastener first surface, and a fastener second surface forming a thin flexible dimension of said conformable fastener, a fastener first end, and a fastener second end, wherein said fastener second surface is disposed in opposed relation to said fastener first surface;
a fastener longitudinal axis passing through said fastener first end and said fastener second end;
an elongate aperture extending from said fastener first surface to said fastener second surface located on said fastener;
at least two smaller apertures extending from said fastener first surface to said fastener second surface along said fastener longitudinal axis, at least one said at least two smaller apertures located proximate said fastener first end and at least one other of said at least two smaller apertures located proximate said fastener second end, said smaller apertures having a smaller length along said fastener longitudinal axis said smaller apertures having a smaller length along said fastener longitudinal axis than the length of said elongate aperture along said smaller apertures having a smaller length along said fastener longitudinal axis than the length of said elongate aperture along said fastener longitudinal axis; and
wherein said elongate aperture extends between said at least one smaller apertures located proximate said fastener first end and said at least one other smaller aperture located proximate said fastener second end, said elongate aperture having an elongate aperture longitudinal axis substantially collinear with said fastener longitudinal axis and passing through said at least two smaller apertures, wherein said conformable fastener is substantially inelastic, said peg board hook retention apparatus further comprising:
a removable retainer configured so that part of said removable retainer can be passed through said at least one of said apertures, wherein said peg board hook retention apparatus is configured to removably secure said peg board hook to a peg board when part of said peg board hook is passed through at least one hole of said peg board and said part of said removable retainer Is passed through said at least one of said at least two smaller apertures and a different hole of said peg board.

2. The peg board hook retention apparatus as described in claim 1, wherein said elongate aperture retains a portion of said peg board hook.

3. The peg board hook retention apparatus as described in claim 1, wherein said removable retainer comprises a push pin.

4. The peg board hook retention apparatus as described in claim 3 wherein said elongate aperture has a first elongate aperture end and a second elongate aperture end, wherein one of said at least two smaller apertures is closest to said first elongate aperture end and defines a first center, and a different one of said at least two smaller apertures is closest to said second elongate aperture end and defines a second center, and wherein a point that is;
halfway between said first center and said second center, and
on said fastener device longitudinal axis,
is located within said elongate aperture.

5. The peg board hook retention apparatus as described in claim 1, wherein said conformable fastener flexibly conforms to said peg board hook.

6. The peg board hook retention apparatus as described in claim 5, wherein said elongate aperture retentionally adjusts to the configuration of said peg board hook.

7. The peg board hook retention apparatus as described in claim 5, wherein said fastener first and said second surfaces retentionally adjusts to the configuration of said peg board hook.

8. The peg board hook retention apparatus as described in claim 5, wherein said conformable fastener flexibly conforms to said peg board hook.

9. The peg board hook retention apparatus as described in claim 1 wherein said at least two smaller apertures comprises at least two substantially circular apertures.

10. The peg board hook retention apparatus as described in claim 1 wherein said at least two smaller apertures comprises at least three smaller apertures.

11. The peg board hook retention apparatus as described in claim 1 wherein two of said at least three smaller apertures are established on one said of said elongate aperture and one of said at least three smaller apertures is established on another side of said elongate aperture.

12. The peg board hook retention apparatus as described in claim 1 wherein said elongate aperture has a first elongate aperture end and a second elongate aperture end, wherein one of said at least two smaller apertures is closest to said first elongate aperture end and defines a first center, and a different one of said at least two smaller apertures is closest to said second elongate aperture end and defines a second center, and wherein a point that is:
  halfway between said first center and said second center, and
  on said fastener device longitudinal axis,
  is located within said elongate aperture.

* * * * *